United States Patent [19]

Hirose et al.

[11] Patent Number: 5,551,966
[45] Date of Patent: Sep. 3, 1996

[54] OPTICAL WAVEGUIDE AND METHOD OF FABRICATING THE SAME

[75] Inventors: Chisai Hirose; Hiroo Kanamori; Akira Urano; Shinji Ishikawa; Haruhiko Aikawa; Masahide Saito, all of Yokohama, Japan

[73] Assignee: Sumitomo Electric Industries, Ltd., Osaka, Japan

[21] Appl. No.: 181,126

[22] Filed: Jan. 13, 1994

[30] Foreign Application Priority Data

| | | | |
|---|---|---|---|
| Jan. 14, 1993 | [JP] | Japan | 5-005073 |
| Jul. 8, 1993 | [JP] | Japan | 5-169259 |
| Jul. 29, 1993 | [JP] | Japan | 5-188346 |

[51] Int. Cl.$^6$ .................................................. C03B 8/04
[52] U.S. Cl. ............................. 65/377; 65/386; 65/413
[58] Field of Search ........................... 65/380, 415, 429, 65/377, 413

[56] References Cited

U.S. PATENT DOCUMENTS

| | | | |
|---|---|---|---|
| 3,823,945 | 6/1974 | Carpenter | 65/421 |
| 4,425,146 | 1/1984 | Izawa | 65/386 |
| 4,494,968 | 1/1985 | Bhagavatula | 65/386 |
| 4,801,322 | 1/1989 | Suda | 65/415 |
| 4,946,251 | 8/1990 | Ashwell | 65/386 |
| 5,141,549 | 8/1992 | Tumminelli | 65/386 |
| 5,179,614 | 1/1993 | Kanamori | 65/386 |
| 5,194,079 | 3/1993 | Tumminelli | 65/386 |
| 5,196,041 | 3/1993 | Tumminelli | 65/386 |
| 5,198,008 | 3/1993 | Thomas | 65/386 |

FOREIGN PATENT DOCUMENTS

| | | |
|---|---|---|
| 0444582 | 4/1991 | European Pat. Off. . |
| 58-105111 | 6/1983 | Japan . |
| 2066805 | 7/1981 | United Kingdom . |

OTHER PUBLICATIONS

Miyashita, Tadashi, Planar Waveguide Devices on Silicon, 40th Electronic Components & Technology Conference, May 20–23, 1990, pp. 55–59.

Manufacturing Thim Film Optical Waveguide—by Flame Hydrolysis to Deposit Progressively Doped Layer, May, 1982 (JP-A-57 081 213)(Abstract), Derwent Publications Ltd., London.

*Primary Examiner*—John M. Hoffmann
*Attorney, Agent, or Firm*—Cushman Darby & Cushman, L.L.P.

[57] ABSTRACT

In the method for forming an optical waveguide according to this invention, an optical waveguide comprising a core of quartz as a main component, and a cladding layers surrounding the core is formed by deposition of glass fine particles by flame hydrolysis deposition and vitrifying the glass fine particle layers. This method includes a step of transiently increasing a feed amount of phosphorus to a flame burner in forming glass fine particle layers to be the cladding layers. Feeding phosphorus in this step for the first time after a glass fine particle layer is deposited without feeding phosphorus to the flame burner, whereby generation of foreign objects near the core dan be suppressed. The method for fabricating an optical waveguide according to this invention is for fabricating a core 132a or cladding layers 122 142 surrounding the core 132a by flame hydrolysis deposition and is characterized in that the glass fine particle layers are vitrified after the deposition of the phosphorus-content glass fine particle layer, whereby glass films 122a, 122b with a thickness of below 10 μm are formed. This glass film forming step is repeated twice or more times to form the core or the glass layers to be the cladding layers surrounding the core. This invention can suppress inhomogeneous vitrified films and especially can make phosphorus concentrations in the cladding layers uniform. As a result, prapagation losses can be made small.

6 Claims, 16 Drawing Sheets

OPTICAL WAVEGUIDE AND METHOD OF FABRICATING THE SAME

BACKGROUND OF THE INVENTION

1. Field of the Invention

This invention relates to an optical waveguide fabricated by flame hydrolysis deposition, and a method for fabricating the same. Specifically this invention relates to a method for forming a core or a cladding layer of phosphorus content glass film.

2. Related Background Art

Optical waveguides are expected to be one of prospective basic devices of optical systems. Various types of optical waveguides have been proposed, and one of them comprises a core formed mainly of quartz, and a cladding surrounding the core, whereby signal beams are confined in the core to be propagated therethrough. The optical waveguide of this type has the doped core, and the cladding by flame hydrolysis deposition. For example, a known flame hydrolysis deposition (Japanese Patent Laid-Open Publication No. 105111/1983) comprises depositing glass fine particles are deposited from a flame burner to form a porous glass fine particle layer, and heating and vitrifying the glass fine particle layer.

SUMMARY OF THE INVENTION

But propagation losses of the optical waveguides formed by this conventional flame hydrolysis deposition are not sufficiently low. The inventors of the present application have found that their high propagation losses are due to inhomogeneous phosphorus concentrations in the core or the cladding.

An object of this invention is to provide an optical waveguide having a cladding or a core having a homogeneous phosphorus concentration distribution, and a method for fabricating the same.

A first method for fabricating the optical waveguide according to this invention relates to a method for fabricating an optical waveguide which comprises a lower cladding layer of quartz as a main component formed on a substrate, a core of a quartz as a main component formed on the lower cladding layer, and an upper cladding layer of a quartz as a main component formed on the lower cladding layer with the core buried in, a process for forming the lower cladding layer being a flame hydrolysis deposition step of supplying phosphorus-content gas and silicon-content gas to a burner, blowing glass fine particles of phosphorus-content quartz as a main component from the burner to deposit the same on the substrate and form the lower glass fine particle layer, the flame hydrolysis deposition step comprising: a step including a period of time in which a flow rate of the phosphorus-content gas is increased with respect to a flow rate of the silicon-content gas, and a step of heating and vitrifying the lower glass fine particle layer.

In this lower cladding layer flame hydrolysis depositing step a flow rate of the phosphorus-content gas may be transiently increased step functionally or linearly. In this depositing step a minimum value of the flow rate of the phosphorus-content gas is 0.

A second method for forming the lower cladding layer having high uniform phosphorus concentrations may comprise the following steps; i.e., the lower cladding layer may be formed by repeating by plural times a step of supplying phosphorus-content gas and silicon-content gas to a burner, blowing glass fine particles of phosphorus-content quartz as a main component from the burner to form a glass fine particle layer; and a step of heating and vitrifying the glass fine particle layer.

In the lower cladding layer flame hydrolysis depositing steps of the first and the second methods, the silicon-content gas can be $SiCl_4$, and the phosphorus-content gas can be selected from one of $POCl_3$, $PCl_4$, and the mixture thereof.

In the first and the second fabrication methods, the core can be formed by following a flame hydrolysis deposition step of supplying the phosphorus-content gas and the silicon-content gas to the burner, blowing glass fine particles of the phosphorus-content quartz as a main component to the lower cladding layer from the burner and form a core glass fine particle layer, a vitrifying step of heating and vitrifying the core glass fine particles to form a core layer, and a lithography step of etching the core layer by lithography to expose the lower cladding layer.

This core can be formed also by following, after the flame hydrolysis deposition step for forming the lower glass fine particle layer in the first fabrication method, the flame hydrolysis deposition step of supplying the phosphorus-content gas and the silicon-content gas to the burner, blowing the glass fine particles of phosphorus-content quartz as a main component from the burner to deposit the same on the lower glass fine particle layer, the vitrifying step of heating and vitrifying the lower glass fine particle layer and the core glass fine particle layer to form a core layer, and a lithography step of etching the core layer by lithography to expose the lower cladding layer.

In the first and the second fabrication methods, the core can be formed by the flame hydrolysis deposition step and the vitrifying step as the lower cladding layer can be formed. In the upper cladding layer flame hydrolysis deposition step as well, the silicon-content gas is $SiCl_4$, and the phosphorus-content gas is selected from one of $POCl_3$, $PCl_4$ and the mixture thereof, in the flame hydrolysis deposition step for forming the upper cladding layer.

By these methods, an optical waveguide having at least one of the lower cladding layer and the upper cladding layer being doped with phosphorus, and having the phosphorus-doped layer whose thickness-wise phosphorus concentrations have uniformity which is indicated by a minimum value above 75 when a maximum value of the thickness-wise phosphorus concentrations is indicated by 100.

In the first method for fabricating an optical waveguide, which includes the step of transiently increasing a feed amount of phosphorus-content gas supplied to the flame burner in depositing the glass fine particle layers to be the cladding layers, phosphorus concentrations in the finished vitrified optical waveguide films can be substantially uniform. Although it is not empirically certified, it is assumed that phosphorus from the flame burner is added not only to the glass fine particle layers being deposited, but also to already deposited glass fine particle layers. Accordingly it is considered that more phosphorus is distributed lower parts of the glass fine particle layers. In forming the glass fine particle layers, phosphorus is added in a smaller amount for the deposition at lower parts of the glass fine particle layers, and then the amount is increased for the deposition, whereby it is considered that the phosphorus can be distributed homogeneously in the glass fine particle layers. Accordingly concentrations of the phosphorus in the finished vitrified optical waveguide film can be uniform.

When low phosphorus concentrations are necessary in the films, the glass fine particles are deposited without feeding phosphorus to the flame burner, whereby a general concentration of the phosphorus can be low.

In the method for fabricating an optical waveguide according to this invention, the glass layers to be the core or the cladding layers are formed of glass films containing phosphorus. The phosphorus is distributed more in lower parts of the glass film. But changes of the phosphorus distribution can be made small by forming the glass films in a thickness of below 10 μm. By forming such glass films, the core or the cladding layers having small phosphorus distribution changes can be formed in a required thickness.

The thus-fabricated optical waveguide according to this invention is free from locally deviated phosphorus deposition.

DESCRIPTION OF THE PREFERRED EMBODIMENTS

Figure 17A:
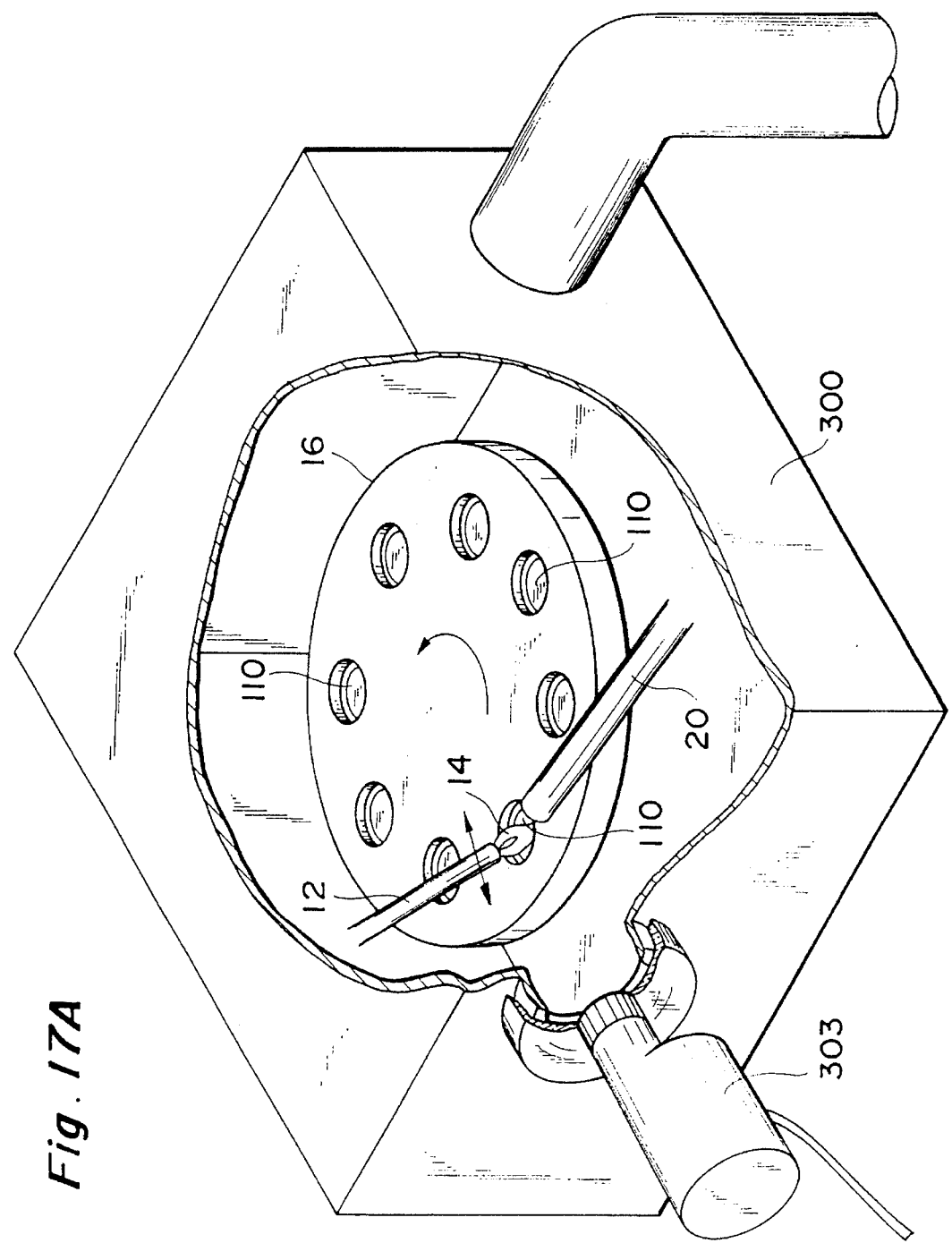
FIG. 17A is a perspective view of the internal structure of the fabrication device, FIG. 17B being a perspective view showing details thereof.

A first embodiment of this invention will be specifically explained. In the first embodiment, a cladding layer and a core layer by the following flame hydrolysis deposition using the apparatus of FIG. 17A.

Each Si substrate 110 for glass fine particles to be deposited on is a 3 inch (75 mm)-diameter Si wafer, and Si substrates are mounted on a turntable 16 in a reaction vessel 300. The reaction vessel 300 is a rectangular parallelepiped vessel of a 740 mm-width, 760 mm-thickness and 200 mm-height. A pressure in the reaction vessel 300 is reduced by a (vacuum pump) scrubber (displacement: −0.1 to −0.3 $mmH_2O$).

Figure 17B:
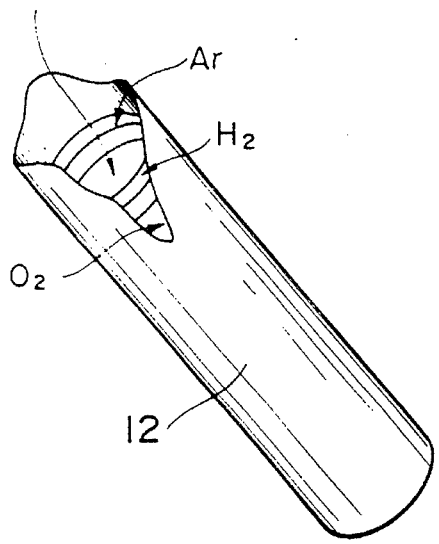

The turntable 16 has a 600 mm diameter and has a heater 301 buried in (as shown in FIG. 17B). A thermocouple 302 of Chromel-Alumel is in contact with the turntable 16, so that temperatures of the Si substrates 110 heated by the heater 301 can be indirectly monitored.

Thus temperatures of the surfaces of the Si substrates 110 for glass fine particles 14 to be deposited on can be maintained at about 600° C. by the thermocouple 302. Glass fine particles from a flame burner 12 are deposited on the Si substrates 110. Concurrently therewith the turntable 16 is turned at 10 rpm, and the flame burner 12 is reciprocated diametrically in the direction of turn thereof over 200 mm at an average speed of 6 mm/min. Thus, the glass fine particles 14 from the flame burner 12 can be uniformly deposited on the Si substrates 110. An exhaust pipe 20 is to be located near the respective Si substrate 110 to discharge surplus glass fine particles 14. Temperatures of the surface of the Si substrate 110 at the time of the deposition of the glass fine particles were measured by a radiation thermometer 303. This optical pyrometer 303 was IT-1650 made by KEYENCE Kabushikikaisha. Temperatures of the surfaces of the Si substrates 110 being heated by the flame burner 12 during the deposition of the glass fine particles 14, which were measured by the radiation thermometer were about 550° C. That is, when an indirect measurement temperature of the Si substrates 110 given by the thermocouple 302 is 600° C., temperatures of the Si substrates 110 measured by the optical pyrometer 303 are 550° C. A heat insulating material is provided on the inside wall of the reaction vessel 300 so that a uniform temperature is given in the reaction vessel 300.

Then, the glass fine particles 14 deposited on the Si substrates 110 together with the Si substrates 110 are heated at high temperatures to be vitrified, and glass films are formed.

The Si substrates were cleaned by a chemical surface treatment and thermal cleaning. That is, the Si substrates 110 were subjected to the chemical surface treatment with hydrofluoric acid, and then loaded for the thermal cleaning in the reaction vessel 300 to be heated up to 600° C. (measured by the thermocouple 302) by resistance heating of the turntable 16 while the flame burner 12 being fed with hydrogen gas and oxygen gas at a set ratio is traversed over the surfaces of the Si substrate 110. The temperature was measured by the thermocouple. A temperature increase rate up to 600° C. was 5° C./min.

Figure 1A:
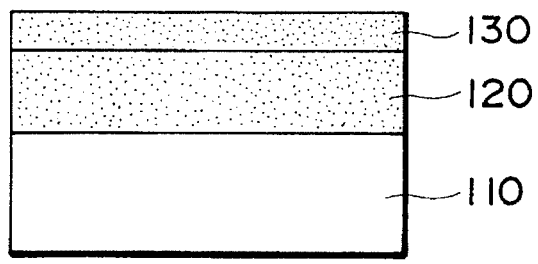
FIGS. 1A, 1B, 1C, 1D, and 1E are sectional views of the optical waveguide in the respective fabrication steps.
Figure 2:
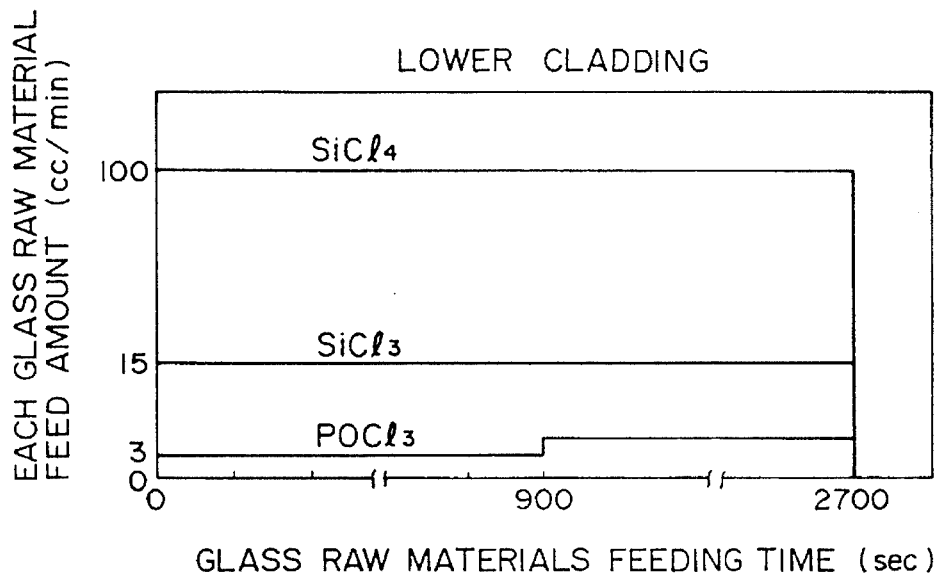
FIG. 2 is a graph of feed amounts of the raw material gases for the formation of the lower cladding layer in a first embodiment.
Figure 3:
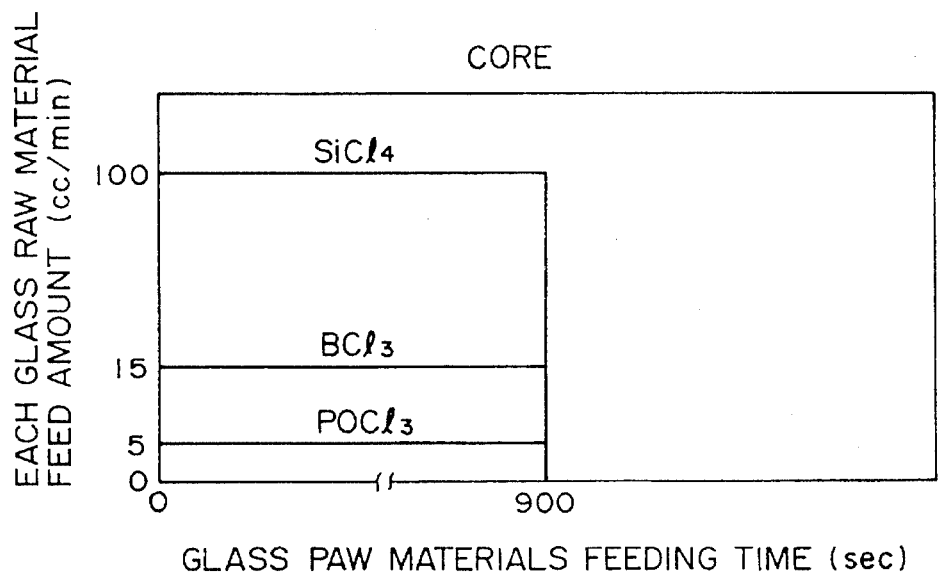
FIG. 3 is a graph of feed amounts of the raw material gases for the formation of the core layer in the first embodiment.

Using this apparatus, a lower fine particle layer 120 (glass fine particle layer) for a lower cladding layer of $SiO_2$—$P_2O_5$—$B_2O_3$ is deposited on each Si substrate 110, and then a core fine particle layer 130 (glass fine particle layer) for a core layer of $SiO_2$—$GeO_2$—$P_2O_5$—$B_2O_3$ (FIG. 1A). Feed amounts of the raw materials fed to the flame burner 12 were as follows. A time schedule of the gases used in the formation of the lower fine particle layer 120 for the cladding layer is shown in FIG. 2, and that of the gasses used in the formation of the core fine particle layer 130 for the core layer is shown in FIG. 3.

A temperature measured by the optical pyrometer 303 at the time of the deposition was 550° C.

1) Lower fine particle layer for the lower cladding layer (45 minutes)

| | |
|---|---|
| SiCl$_4$: | 100 cc/min |
| POCl$_3$: | 3.0 cc/min (for 15 mins. after the start of the deposition) |
| POCl$_3$: | 5.0 cc/min (for 30 mins. after the end of the deposition) |
| BCl$_3$: | 15 cc/min |
| Ar: | 2 l/min |
| H$_2$: | 2 l/min |
| O$_2$: | 6 l/min |

2) Core fine particle layer for the core layer (15 minutes)

| | |
|---|---|
| SiCl$_4$: | 100 cc/min |
| GeCl$_4$: | 10 cc/min |
| POCl$_3$: | 5.0 cc/min |
| BCl$_3$: | 15 cc/min |
| Ar: | 2 l/min |
| H$_2$: | 2 l/min |
| O$_2$: | 6 l/min |

The flow rates of the fed gases were measured by the flow rate controller made by NIPPON TYLAN Kabushikikaisha. The flame burner 12 comprises four conically arranged cylinders as shown in FIG. 17B. Innermost cylinders of the flame burner 12 are fed with reaction gases, such as POCl$_3$ gas, SiCl$_4$, GeCl$_4$, BCl$_3$, etc. Hydrogen gas is fed inbetween the innermost cylinders and the second innermost cylinders. Two l/min of Ar gas stated above is fed inbetween the second innermost cylinders and the third innermost cylinders. Oxygen gas is fed inbetween the third innermost cylinders and the fourth innermost cylinders. Ar gas is caused to thus flow between the hydrogen gas and the oxygen gas, whereby reaction between the hydrogen gas and the oxygen gas at the end of the gas emitting orifice of the gas burner 12 can be suppressed.

Figure 18:
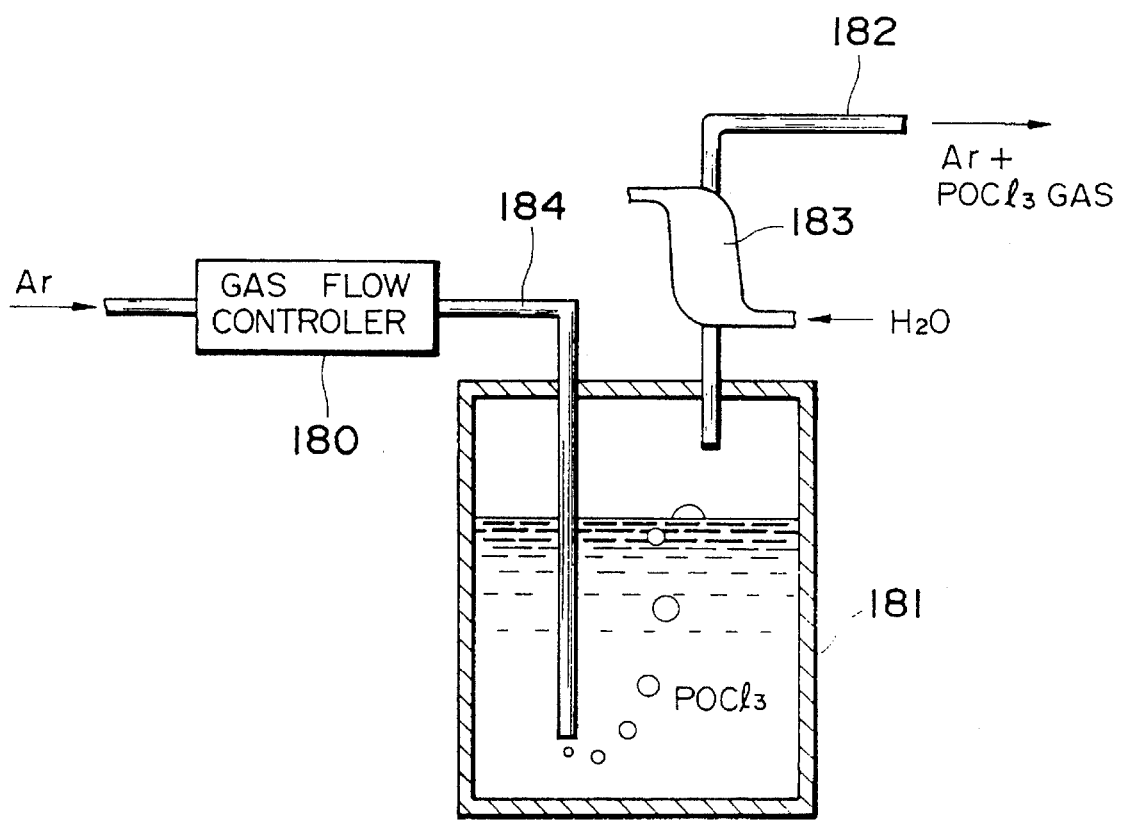
FIG. 18 is a view explaining a feed system of $POCl_4$ gas.

The POCl$_3$ gas above stated is fed into the reaction vessel 300 by the apparatus of FIG. 18 on a carrier of Ar gas different from the two l/min of Ar gas for the suppression of the reaction of the hydrogen gas and the oxygen gas. In this apparatus, first, Ar gas is introduced into the POCl$_3$ in a tank 181 through a pipe 184 at a flow rate controlled by a flow rate controller 180. Then the Ar gas is bubbled in the liquid POCl$_3$, and the Ar gas containing the POCl$_3$ gas is introduced into the pipe 182. The pipe 182 is in communication with the reaction vessel 300 so that the Ar gas and the POCl$_3$ gas are fed into the flame burner 12 in the reaction vessel. The pipe 182 is partially in a condenser 183 for cooling the pipe 182, so that the gas flowing through the pipe 182 is kept at a set temperature.

A flow rate of the POCl$_3$ gas was 5 cc/min at a certain period of time. During the certain period of time, a temperature of the tank 181 was 25° C., a temperature of the condenser 183 being 20° C., a vapor pressure of the POCl$_3$ being 30 mmHg, and a flow rate of the Ar as a carrier gas being 121.7 cc/min which corresponds to 5 cc/min of the POCl$_3$ gas. The Ar gas, which is inert, does not react with the POCl$_3$ gas and is effective as a carrier gas for the POCl$_3$ gas. As a carrier gas for the POCl$_3$ gas, other rare gas, such as He, Ne, Kr, Xe, etc., are usable.

In this embodiment, POCl$_3$ is used to dope phosphorus, but PCl$_4$ may be used in place of POCl$_3$.

Figure 1B:
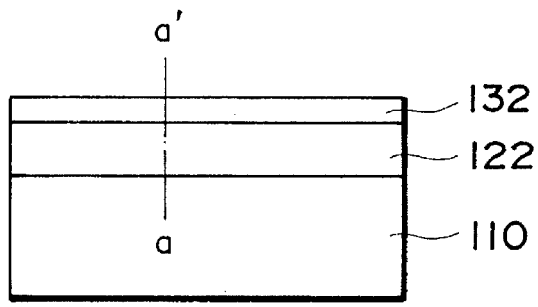

The double structure of the glass fine particle layers 120, 130 of FIG. 1A thus deposited is vitrified by heating up to 1380° C. in an atmosphere of He:O$_2$=10:1, and a transparent glass film comprising a lower cladding layer 122 and a core layer 132 was prepared (FIG. 1B). A heating temperature for the vitrification was measured by a thermocouple of platinum of platinum rhondium (13%) disposed in the electric furnace not shown.

A concentration distribution of phosphorus pentoxide (P$_2$O$_5$) thickness-wise of the thus prepared glass film was analyzed by an EPMA (Electron Probe X-ray Microanalyzer) not shown. The EPMA measuring apparatus used in this embodiment was GXA-8621M made by Nippon Denshi Kabushikikaisha (JEOL, LTD). In measuring its concentrations, the lower cladding layer 122 and the core layer 132 were polished using diamond abrasive materials to expose their thickness-wise sectional surfaces. In the polishing, 9 μm, 3 μm and 1 μm particle size-diamond abrasive materials were used in the stated order to expose sectional surfaces as flat and smooth as possible. The thus-prepared samples were loaded in the EPMA measuring apparatus, and phosphorus concentrations were measured at a 7 kV acceleration voltage and a $2 \times 10^{-7}$ A current.

The thus-formed lower cladding layer 122 and the core layer 132 respectively had a 10±0.6 μm thickness and a 30±1.5 μm thickness. The thickness was measured by a Scanning Electron Microscope made by NIPPON DENSHI Kabushikikaisha (JEOL). The measured phosphorus concentration distribution is shown in FIG. 4.

Figure 4:
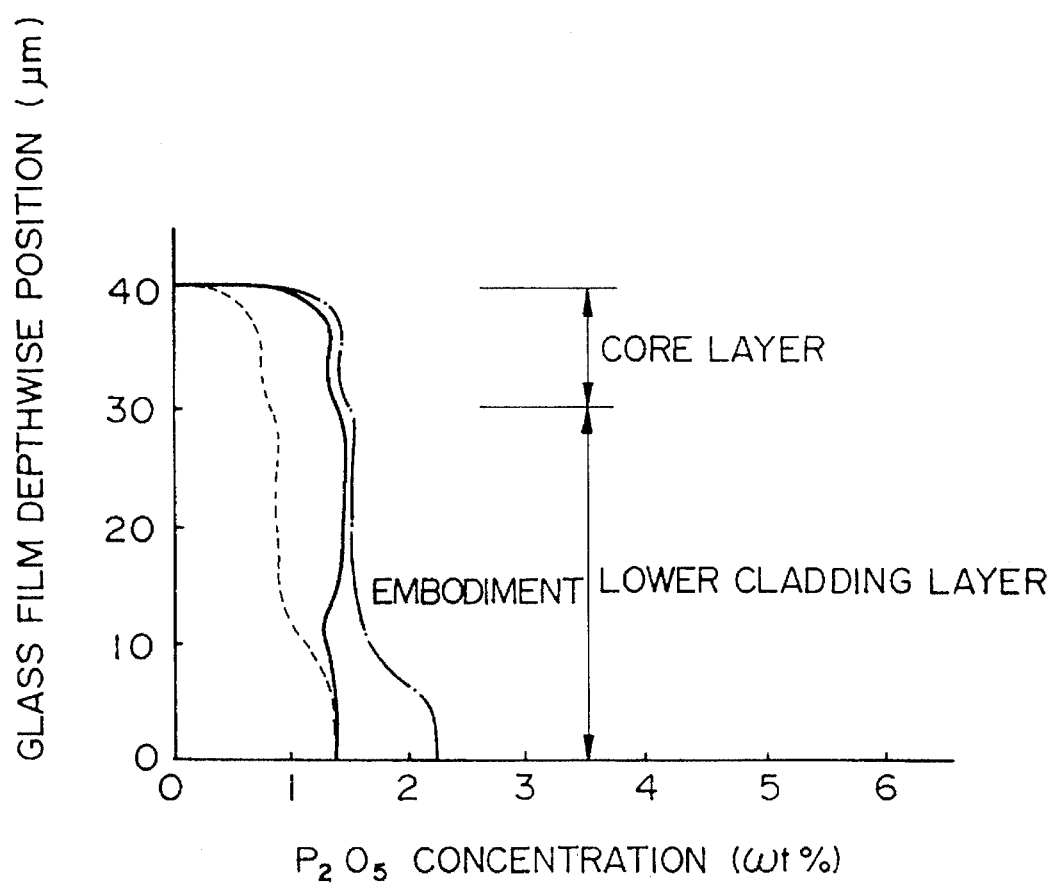
FIG. 4 is a graph of the compositions of the glass films formed by the method according to the first embodiment.

The solid line in FIG. 4 indicates a concentration profile (wt %) of phosphorus pentoxide (P$_2$O$_5$) in the a–a' section in FIG. 1B. As shown in FIG. 4, P$_2$O$_5$ concentrations are in a range of 1.2–1.4 wt % in the lower cladding layer 122. It is seen that a glass film having a homogeneous thickness-wise distribution of phosphorus concentrations. Concentrations of B$_2$O$_3$ were substantially uniformly 1.8 wt % in the lower cladding layer 122. The core layer 132 contains Ge, and has higher refractive indexes than the lower cladding layer 122 and an upper cladding layer 142 which will be formed later.

Grounds for increases of a phosphorus feed amount in thus forming the glass fine particle layers can make phosphorus concentrations in the lower cladding layer uniform are considered to be as follows. Phosphorus in the flame burner 12 is added to the formed glass fine particle layers. Accordingly a phosphorus added amount in the glass fine particle layers is a total of an added amount during the deposition, and an added amount after the deposition. Although it depends on thicknesses of the glass fine particle layers, the effect of changes in a phosphorus feed amount supplied to the flame burner 12 is generally considered larger during the deposition of the glass fine particle layers than after their deposition. Thus, by suitably adjusting an increase in a feed amount of phosphorus to the flame burner 12 during the deposition as described above, phosphorus concentrations in the glass fine particle layers or an optical waveguide prepared by vitrifying the glass fine particle layers can be kept substantially uniform. In addition, it is considered that the heating for vitrification following the formation of the lower glass fine particle layer 120 sufficiently diffuses phosphorus, with the result that phosphorus concentrations in the lower cladding layer 122 can be more uniform.

The one-dot line and the dot line in FIG. 4 indicate the results of controls for making sure the above-described effect. The one-dot line in FIG. 4 indicates the composition analysis result of the vitrified glass film in the case that a feed amount of POCl$_3$ was kept always at 5.0 cc/min in the formation of the lower fine particle layer 120 (the other conditions were the same as in the steps of FIGS. 1A and 1B). $P_2O_5$ concentrations in the lower cladding layer 122 was 2.2 wt % near the substrate, and 1.4 wt % at a 20 μm-thicknesswise position in the lower cladding layer 122 (with the boundary between the substrate and the lower cladding layer set at the origin), and it was found that the phosphorus concentration distribution largely deviates thickness-wise.

The dot line in FIG. 4 indicates the composition analysis result of the vitrified glass film in the case that a feed amount of $POCl_3$ was kept always at 3.0 cc/min in the formation of the lower fine particle layer 120 (the other conditions were the same as in the steps of FIGS. 1A and 1B). $P_2O_5$ concentrations in the lower cladding layer 122 was 1.3 wt % near the substrate, and 0.8 wt % at a 20 μm-thicknesswise position in the lower cladding layer 122. The phosphorus concentration distribution largely deviates as indicated by the one-dot line.

Thus, in the method for fabricating the optical waveguide according to this embodiment, an optical waveguide having thickness-wise concentrations of phosphorus in the phosphorus-doped lower cladding layer 122 or upper cladding layer 142 whose minimum thickness-wise concentration is at least above 75 with a maximum thickness-wise concentration set at 100 could be fabricated. In this embodiment, the minimum value is above 95.

Figure 1C:
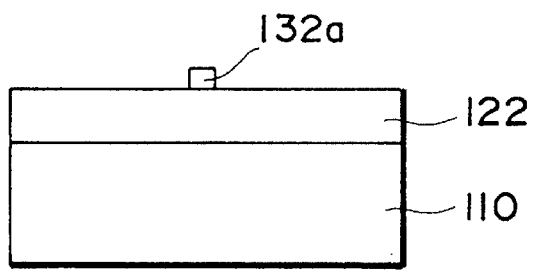
Figure 1D:
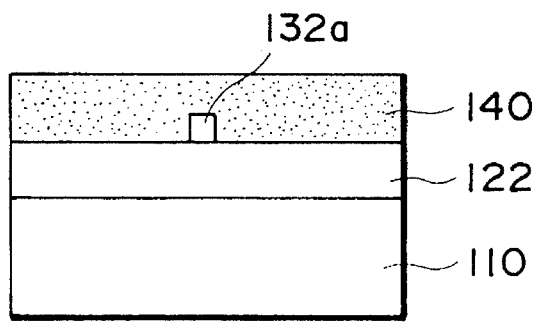
Figure 5:
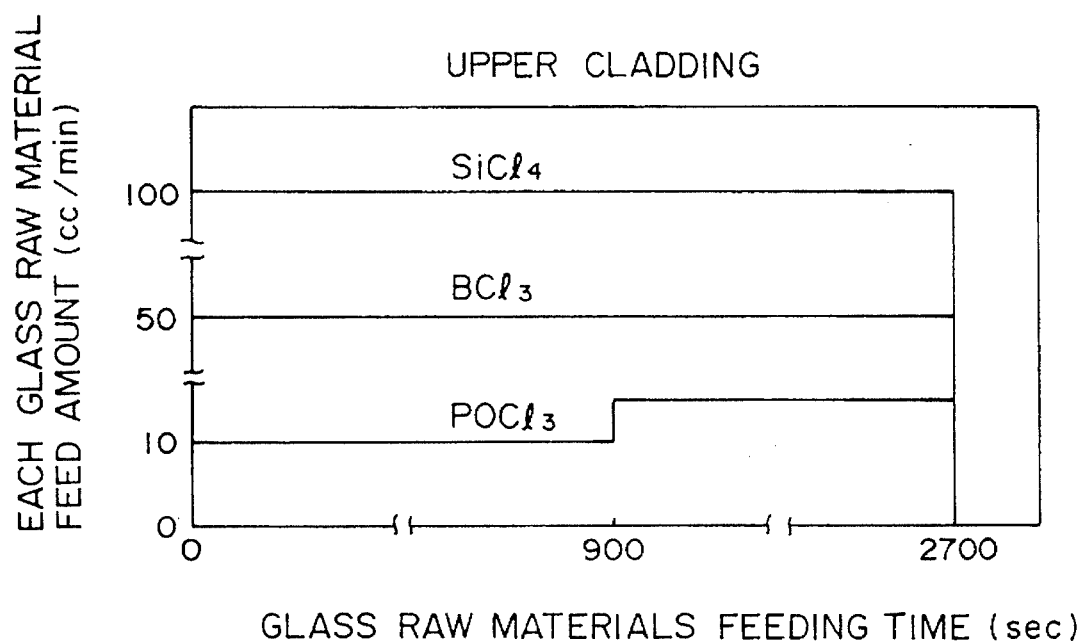
FIG. 5 is a graph of the feed amounts of the raw material gases for the formation of the upper cladding in the first embodiment.

Then, a region of the glass film for the core layer 132 to be formed in FIG. 1B was formed into 10 μm-width straight ridges by photolithography and reactive ion etching (RIE), and a core 132a was formed (FIG. 1C). The thus-formed core 132a had a 8 μm-width and a 8 μm-thickness. The reaction gases used in the RIE were $C_3H_8$ and $CCl_4$. Then, on the core 132a and the lower cladding layer 122, a glass fine particle layer 140 of $SiO_2$—$P_2O_5$—$B_2O_3$ for the upper cladding layer was deposited for 45 minutes (FIG. 1D). The conditions for this deposition were a little different from those for the deposition of the lower cladding layer 122, and feed amounts of the raw materials supplied to the flame burner 12 were as follows. FIG. 5 shows the time schedule of the gases used in the formation of the glass fine particle layer 140.

1) Upper fine particle layer for the upper cladding layer

| | |
|---|---|
| $SiCl_4$: | 100 cc/min |
| $POCl_3$: | 10.0 cc/min (for 15 minutes after the start of the deposition) |
| $POCl_3$: | 15.0 cc/min (for 30 minutes after the end of the deposition) |
| $BCl_3$: | 50 cc/min |
| Ar: | 2 l/min |
| $H_2$: | 2 l/min |
| $O_2$: | 6 l/min |

A rotation number of the turntable 16, a diameter of the turntable, conditions for traversing the flame burner 12, etc. were the same as in the step shown in FIG. 1A. A flow rate of the $POCl_3$ gas was 10 cc/min at a certain period of time. During the certain period of time, a temperature of the tank 181 was 40° C., a temperature of the condenser 183 being 35° C., a vapor pressure of the $POCl_3$ being 60 mmHg, and a flow rate of the Ar as a carrier gas being 116.7 cc/min which corresponds to 10 cc/min of the $POCl_3$ gas.

Figure 1E:
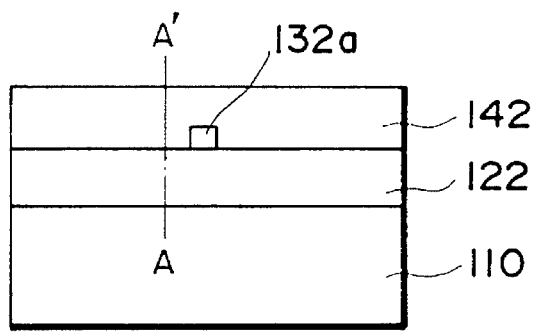

The glass fine particle layer 140 thus formed on the glass film comprising the core 132a and the lower cladding layer 122 was heated up to 1250° C. in an atmosphere of He:$O_2$= 10:1 for vitrification, and an optical waveguide including the core 132a between the lower cladding layer 122 and the upper cladding layer 142 was prepared. FIG. 1E shows the sectional structure of the optical waveguide. As shown in FIG. 1E, the lower cladding layer 122 is formed on the Si substrate 110, and the core 132a in the form of straight ridges is formed. The upper cladding layer 142 is further formed in such a manner as to cover the core 132a. An element distribution in the A–A' section of the optical waveguide of FIG. 1E was measured in the same way by the EPMA.

Figure 6:
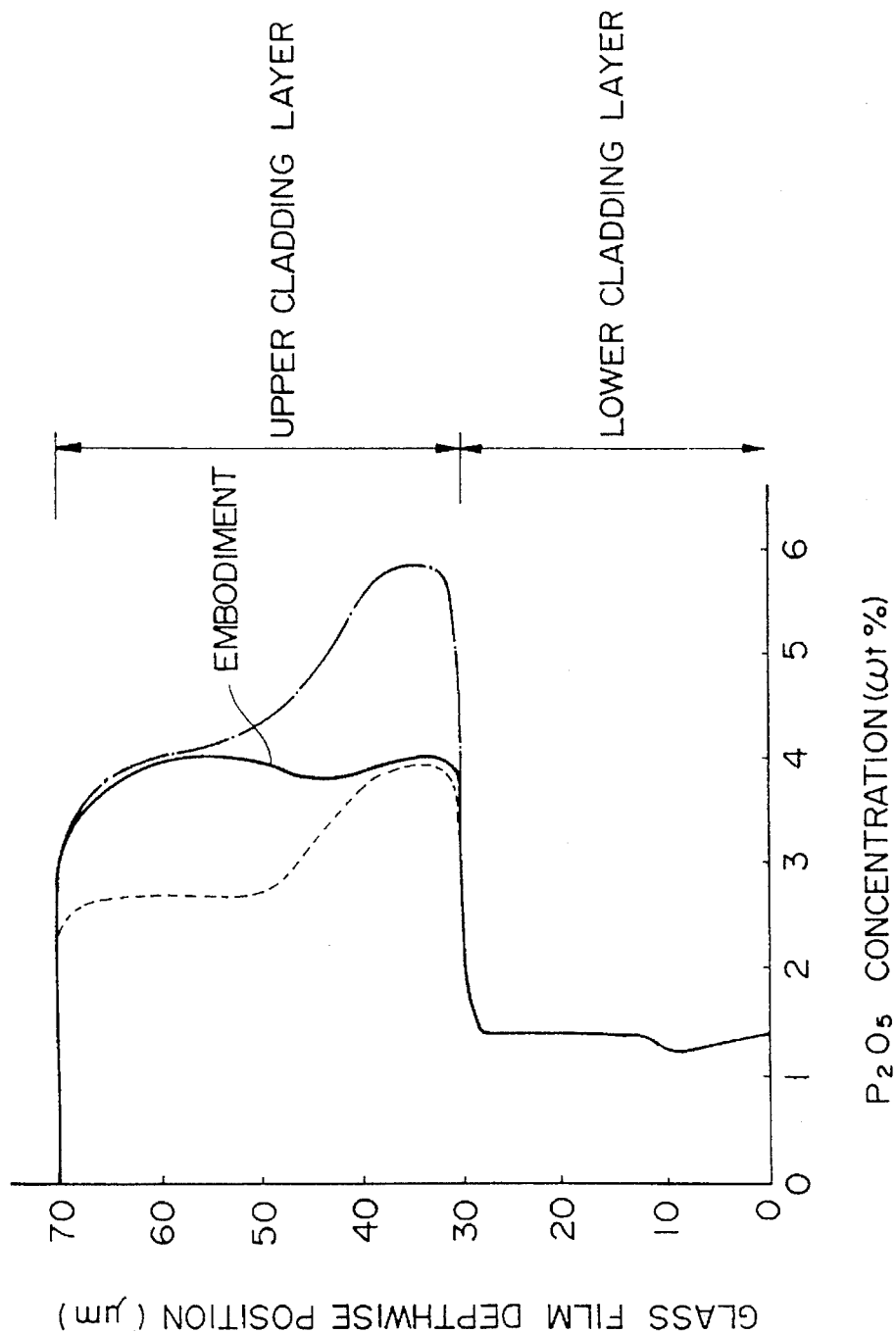
FIG. 6 is a graph of the compositions of the glass films of the optical waveguide fabricated by the first embodiment.

In FIG. 6 the solid line indicates a profile of phosphorus pentoxide ($P_2O_5$) concentrations in the A–A' section. It is found that $P_2O_5$ concentrations in the upper cladding layer 142 were in a range of 3.7–4.0 wt % and are substantially uniform thicknesswise. The $P_2O_5$ concentration is decreased in the uppermost part (65–70 μm-thicknesswise position in the glass film) of the upper cladding layer 142, which is considered to cause no substantial influence on optical waveguiding conditions in the core 132a.

The one-dot line and the dot line in FIG. 6 indicate the results of controls for making sure the above-described effect. The one-dot line in FIG. 6 indicates the result of the composition analysis of the glass film after the vitrification in the case that a feed amount of $POCl_3$ was kept always at 15 cc/min in the formation of the glass fine particle layer (the other conditions were the same as in the steps of FIGS. 1D and 1E). $P_2O_5$ concentrations in the upper cladding layer 142 deviated in a range of 5.9 to 4.0 wt %, and it is found that phosphorus depth-wise concentrations cannot be made uniform.

The dot line in FIG. 6 indicates the result of the composition analysis of the glass film after the vetrification in the case that a feed amount of $POCl_3$ was kept 10 cc/min. in the formation of the glass fine particle layer (the other conditions were the same as in the steps of FIGS. 1D and 1E). $P_2O_5$ concentrations in the upper cladding layer 142 deviated in a range of 4.0–2.6 wt %, and it is found that phosphorus depth-wise concentrations cannot be made uniform.

As evident from the results of FIGS. 4 and 6, in the method for fabricating the optical waveguide according to this invention, even with some changes to the conditions, the cladding layers 122, 142 can have substantially uniform phosphorus compositions. That is, suitable adjustment of increases of a feed amount of phosphorus supplied to the flame burner 12 can keep phosphorus concentrations contained in the vitrified optical waveguide substantially uniform. Accordingly refractive index distributions of the cladding and the core can be made substantially uniform, and the thus fabricate optical waveguide can have small propagation losses.

A second embodiment of this invention will be explained. The method for fabricating the optical waveguide according to this embodiment is for securing uniform phosphorus width-wise concentrations in the glass film.

This embodiment is the same as the first embodiment but is different from the latter in that in the step of FIG. 1D the conditions for forming the glass fine particle layer 140 on the glass film (the lower cladding layer 122 and the core 132a), and the conditions of the later heat treatment are a little changed.

Figure 7:
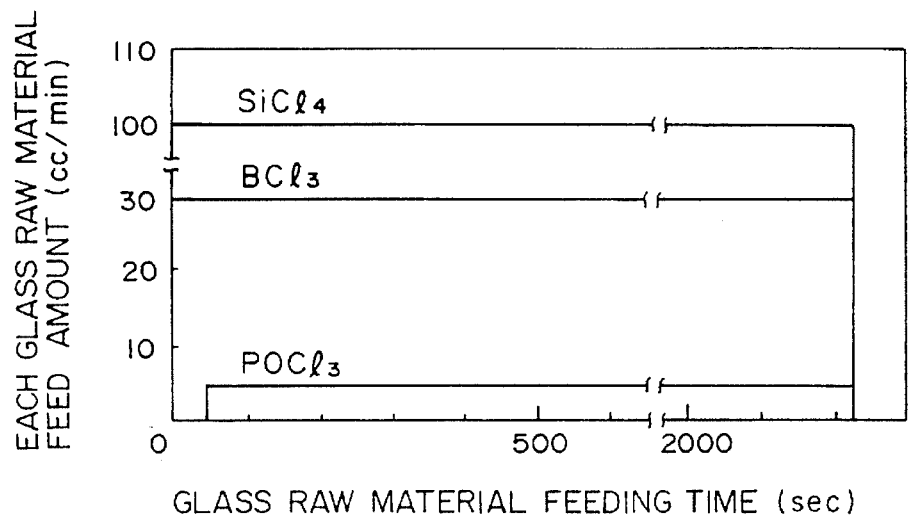
FIG. 7 is a graph of the feed amounts of the raw material gases in a second embodiment.

The steps up to that of FIG. 1C where the core layer 132 is ridged were conducted to form the core 132a. Then a glass fine particle layer 140 for the upper cladding layer 142 of $SiO_2$—$P_2O_5$—$B_2O_3$ is deposited thereon (FIG. 1D). Conditions for this deposition were a 6 l/min $O_2$ gas flow rate, a 2 l/min $H_2$ gas flow rate and a 2 l/min Ar gas flow rate. These conditions were the same as those of the first embodiment, but flow rates of the other gases ($SiCl_4$, $POCl_3$, $BCl_3$) were as shown in FIG. 7. The deposition was conducted without feeding POCl₃ gas, and after some time (about 50 sccs.) POCl₃ gas was fed at a flow rate of 5 cc/min to deposit the glass fine particle layer 140. This is a main difference of this embodiment from the first embodiment. That is, a glass fine particle layer containing no phosphorus, and a glass fine particle layer containing phosphorus are alternately laid. Thus, the optical waveguide prepared by the fabrication method according to the second embodiment could have a phosphorus doped lower cladding layer 122 and the upper cladding layer 142 which have uniform phosphorus concentrations having a minimum phosphorus concentration indicated by 75 when a maximum phosphorus concentration is indicated by 100. The minimum value in this embodiment was above 95.

Then the glass fine particle layer 140 deposited on the substrate was heat treated by a heating furnace to vitrify the glass fine particle layer 140 and synthesize the upper cladding layer 142, and a buried-type optical waveguide was prepared (FIG. 1E). In this heat treatment, the room temperature (24° C.) was raised at a temperature increasing rate of 20° C./min up to 1300° C. for the heat treatment and retained for 6 hours at the heat treatment temperature, and then lowered to the room temperature at a temperature decreasing rate of 1° C./min. Thus the glass fine particle layer 140 was vitrified to form the cladding layer 142. A glass film (122, 142) thus synthesized on these conditions had a thickness of 25 μm.

Figure 8:
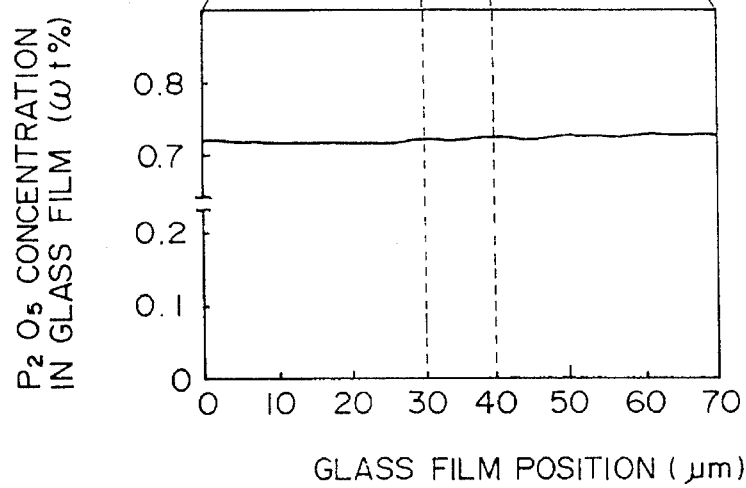
FIG. 8 is a graph of the compositions of the glass films of the optical waveguide fabricated by the second embodiment.

The thus-fabricated buried-type optical waveguide was observed. No foreign objects were generated near the core 132a. FIG. 8 shows a distribution of concentrations of phosphorus pentoxide ($P_2O_5$) in the section of the buried-type optical waveguide. The C–C' is the analysis line. No deflection of phosphorus near the core 132a was found. A phosphorus concentration in the glass film was substantially uniformly about 0.72 wt %.

Figure 9:
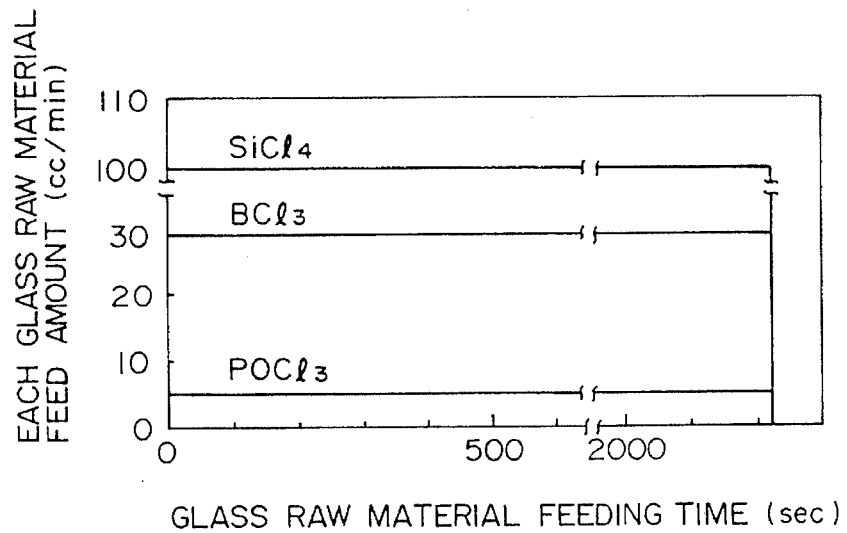
FIG. 9 is a graph of the feed amounts of the raw materials of controls for the second embodiment.
Figure 10:
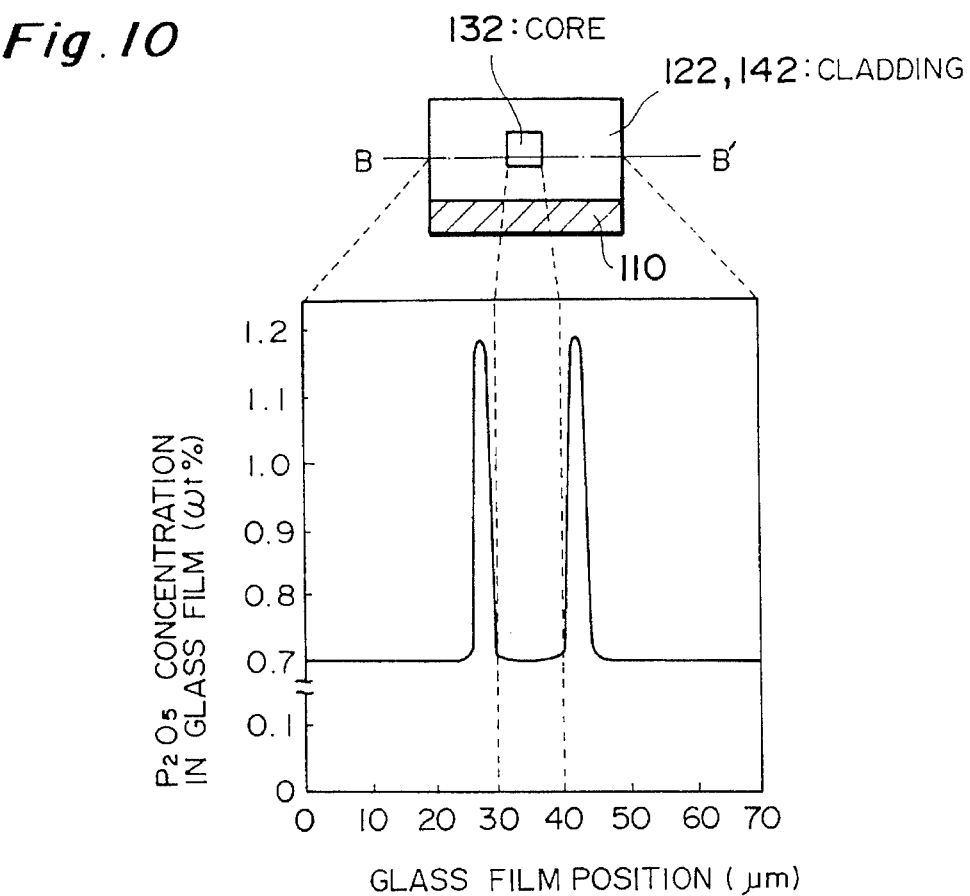
FIG. 10 is a graph of the compositions of the glass films of the optical waveguide fabricated by the above control.

To make sure this effect, an experiment for a control was conducted with varied gas flow rates as shown in FIG. 9 for the deposition of the glass fine particle layer 140 (the other conditions were the same). The fabricated buried-type optical waveguide was observed. Foreign objects were found along the side surfaces of the core 132a. A phosphorus distribution was measured along the B–B' analysis line shown in FIG. 10 of this buried-type optical waveguide. A high concentration of phosphorus was detected near the side surfaces of the core 132a (FIG. 10). Many of the foreign objects were found at the location where the high concentration of phosphorus was detected. The generation of the foreign objects is considered to result from contamination of impurities from the inner wall in the reaction vessel 300. That is, to thus form the optical waveguide, very high temperatures are required, and the use of the flame burner 12 is considered to cause convections of the gases in the reaction vessel 300, with the result that impurities mixed in near the core 132a.

As evident from these result, in the method for fabricating the optical waveguide according to this invention, in depositing the glass fine particle layer 140 on the lower cladding layer 122 and the core 132a, the glass fine particle layer 140 is formed higher than the interface between lower cladding layer 122 and core 132a with no addition of phosphorus, and then phosphorus is added, whereby concentrations of phosphorus contained in the vitrified optical waveguide film (the upper cladding layer 142 and the core 132a in this case) can be kept substantially uniform, and generation of foreign objects due to deposition of phosphorus of high concentrations can be suppressed. Thus, the thus fabricated optical waveguide can have smaller propagation losses.

In the first and the second embodiments, the raw material gases for forming the glass fine particle layers 120, 130, 140 were, e.g., POCl₃ and BCl₃, but instead POCl₃, PCl₄, BBr₃, etc. may be fed to the flame burner 12. In the above-described embodiment, a flow rate of POCl₃ to be fed to the flame burner 12 was once changed, but it is possible to change a flow rate of the POCl₃ in steps or gradually in accordance with the progress of the steps.

That is, transient changes of a flow rate of the POCl₃ gas are exemplified in FIGS. 16A, 16B, 16C, and 16D. In FIGS. 16A, 16B, 16C, and 16D time is taken on the horizontal axis, and feeding flow rates (a. u.) of the POCl₃ are taken on the vertical axis. A feeding flow rate of the POCl₃ is increased from an arbitrary time in step function in FIGS. 16A and 16B and linearly in FIGS. 16C and 16D up to a set feeding flow rate. Transient increases of a gas flow rate of POCl₃ may be increased in two-dimensional function, exponential function or logarithmic function.

When the POCl₃ gas is fed, flow rates of the other gases are set constant. It is not necessary that concentrations of phosphorus are uniform throughout the upper cladding layer 142 and the lower cladding layer 122. That is, it suffices that a part of the lower cladding layer 122 near the interface between the core 132a and the lower cladding layer 122 (below a 5 μm thickness from the interface), and parts extended directly above and below the upper cladding layer 142 near the interface of the core 132a and the upper cladding layer 142 (below a 5 μm thickness from the interface). A phosphorus feed amount supplied to the flame burner 12 is increased when parts of the glass fine particle layers corresponding to these parts are formed.

In terms of uniform refractive indexes, it is preferable that a minimum feeding flow rate of the POCl₃ is 0–40 with a maximum feeding flow rate thereof set at 100. More preferably, its minimum feeding flow rate is 0–10. Furthermore, in terms of uniform refractive indexes, it is preferable that a ratio (max/min) of a maximum (max) and a minimum (min) feeding flow rate values of the POCl₃ is below 2.5. More preferably a ratio (max/min) between the maximum (max) and the minimum (min) feeding flow rates is below 10.

As described above, in the method for fabricating the optical waveguide according to this invention, in depositing the glass fine particle layer to be the cladding layer 122; 142, a feed amount of phosphorus supplied to the flame burner 12 is transiently increased, and increases of the feed amount of phosphorus to the flame burner 12 are suitably adjusted, whereby concentrations of phosphorus contained in the vitrified optical waveguide film can be substantially uniform. Thus, refractive indexes of the cladding layer can be substantially uniform, and the thus fabricated optical waveguide can have small propagation losses.

Phosphorus is fed to deposit the glass fine particle layer after depositing the glass fine particle layer without feeding phosphorus to the flame burner 12, whereby generation of foreign objects in the interface between the cladding layer and the core can be suppressed.

Thus in this invention, a feed amount of phosphorus is transiently increased especially at the early stage of the step of depositing glass with phosphorus-content flames, whereby phosphorus concentrations in the formed glass film can be substantially uniform. A second method for fabricating optical waveguide which can make concentrations of phosphorus in the glass film uniform includes repetition of the flame hydrolysis deposition step and the vitrification step will be explained by means of a third and a fourth embodiments of this invention.

Figure 17B:
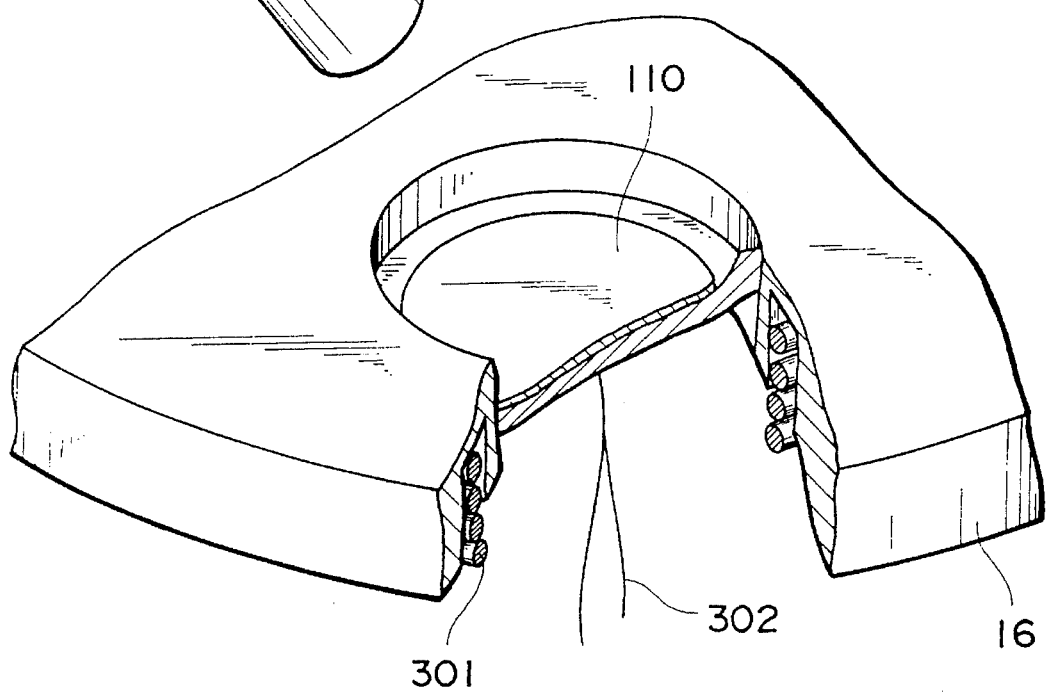

The third embodiment will be explained with reference to drawings. The same method as in the first embodiment was used to deposit glass fine particles. That is, in the apparatus of FIG. 17, glass fine particles 14 were deposited by mounting Si substrate 110 on a turntable 16 with an internal heater buried in, disposed in a reaction vessel 300, turning the turntable 16 with a surface temperature of Si substrate 110 kept at about 600° C., and reciprocating the flame burner 12 diametrically in the direction of turn thereof. This is known art. Thus the glass fine particles 14 from the flame burner 12 were homogeneously deposited on each Si substrate 110.

Figure 11A:
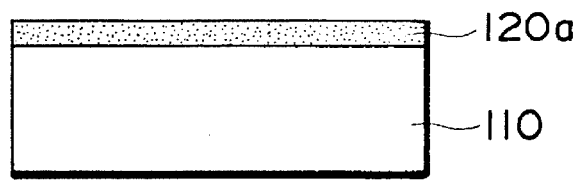
FIGS. 11A, 11B, 11C, and 11D are sectional views of the optical waveguide in the respective fabrication steps.

A glass fine particle layer 120a for the lower cladding layer of $SiO_2$—$P_2O_5$—$B_2O_3$ was deposited on the Si substrate 110 (FIG. 11A). In depositing the glass fine particle layer, $H_2$ and $O_2$ were fed to the flame burner 12 respectively at a 2 l/min flow rate and a 6 l/min flow rate, and raw material gases were fed in the compositions and the flow rates in Table 1, and a depositing time was 15 minutes.

TABLE 1

| RAW MATERIAL GAS | FLOW RATE (cc/min) |
| --- | --- |
| $SiCl_4$ | 100 |
| $BCl_3$ | 30 |
| $POCl_3$ | 7.3 |

Figure 11B:
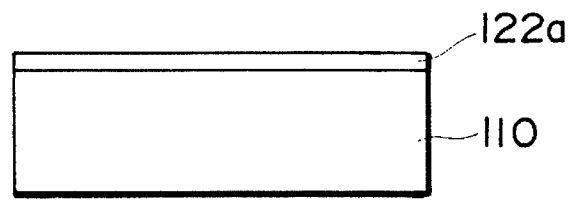

The glass fine particle layer 120a deposited on the Si substrate 110 is heat treated with the heating furnace (not shown), and a transparent glass film 122a was prepared (FIG. 11B). In this heat treatment, the room temperature was raised up to a 1380° C. heat treatment temperature at a temperature increasing rate 20° C./min, and the heat treatment temperature was kept for 6 hours and then lowered down to the room temperature at a temperature decreasing rate of 10° C./min.

Figure 11C:
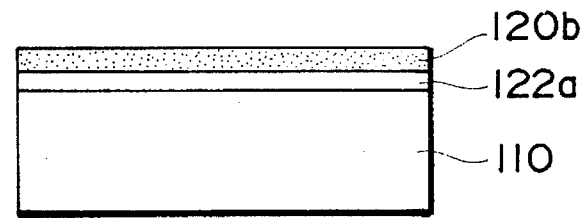
Figure 11D:
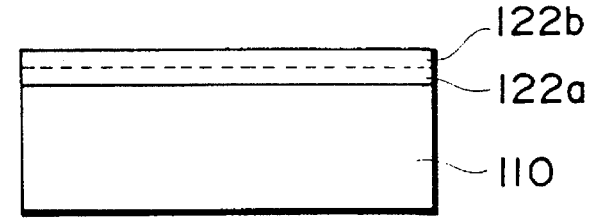
Figure 12A:
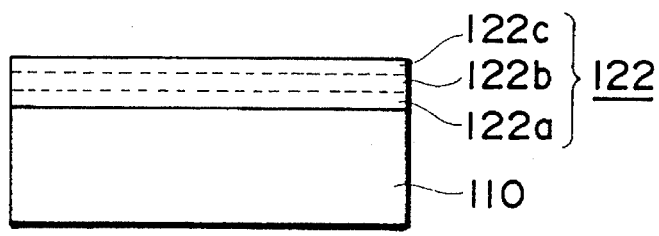
FIG. 12A, 12B, 12C, and 12D are sectional views of the optical waveguide in the respective fabrication steps.

Then, under the same conditions, a glass fine particle layer 120b was deposited (FIG. 11C) and vitrified to form a glass film 122b (FIG. 11D). Then in the same way, a glass fine particle layer was deposited and vitrified to form a glass film 122c (FIG. 12A). Thus the deposition and vitrification of the glass fine particle layers were repeated three times, and a lower cladding layer 122 of three layers of the glass film was formed. This lower cladding layer 122 had a 30 μm-thickness, and each glass film 122a, 122b, 122c had a 10 μm-thickness.

Figure 13:
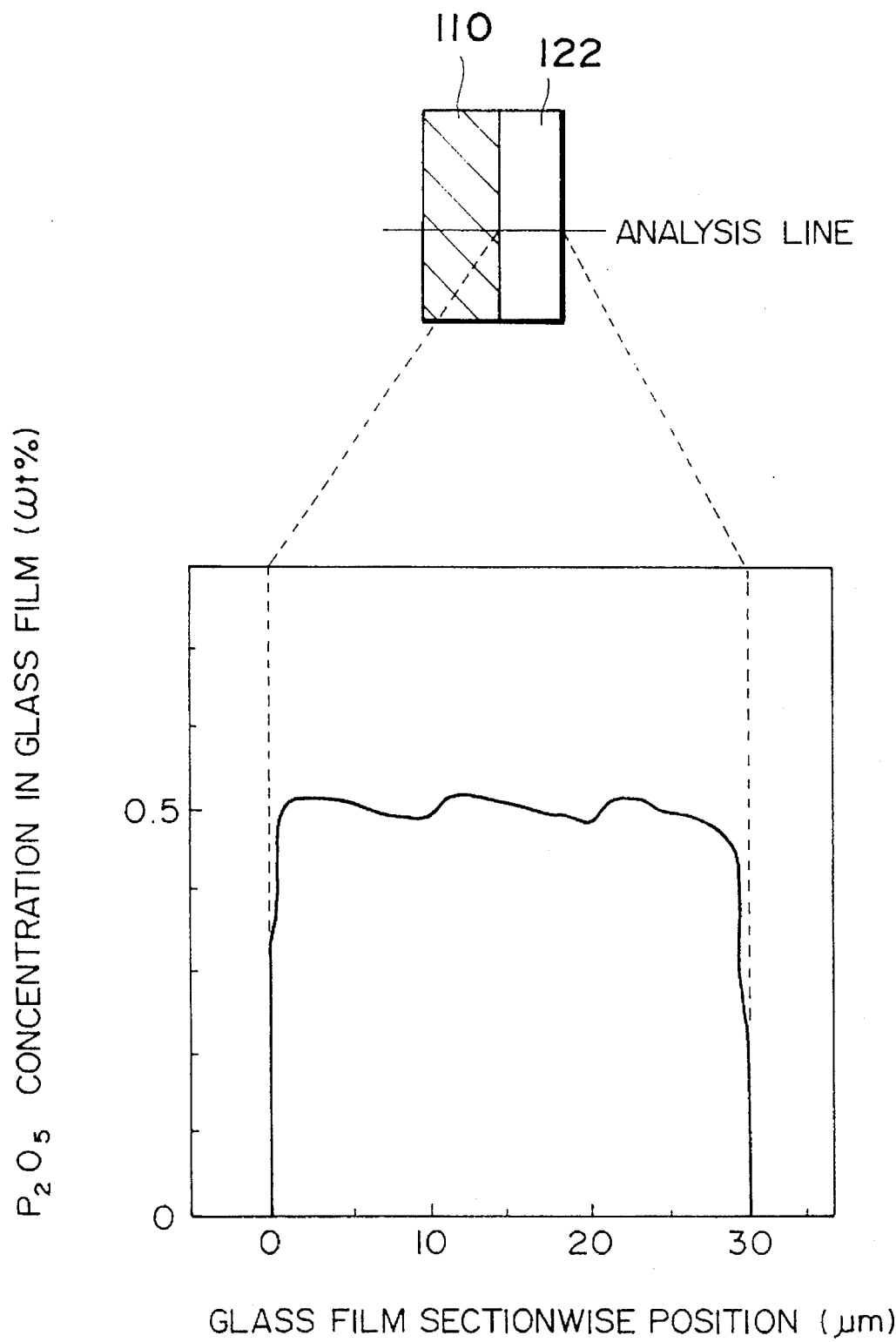
FIG. 13 is a graph of the compositions of the glass films prepared by the method according to a third embodiment.

FIG. 13 shows the profile of thickness-wise $P_2O_5$ concentrations (wt %) in the lower cladding layer 122 on the substrate 110 (FIG. 12A). As shown, a $P_2O_5$ concentration in the lower cladding layer 122 is substantially 0.5 wt % and in a range of ±0.13. Changes of a refractive index difference Δn is about ±0.002%. Thus it is seen that the $P_2O_5$ is uniformly distributed, and a homogeneous glass film can be formed. This measurement was conducted by the same EPMA device and the same method as in the above-described embodiments.

Figure 12B:
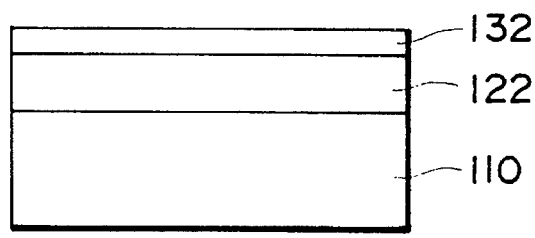
Figure 12C:
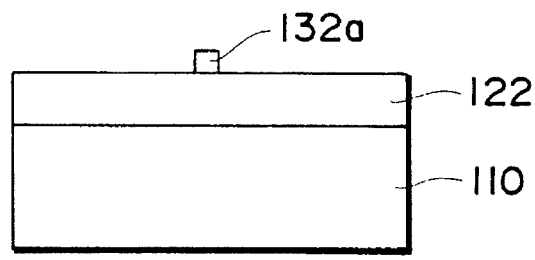

Then a glass fine particle layer to be the core of $SiO_2$—$GeO_2$—$P_2O_5$—$B_2O_3$ was deposited. The conditions for this deposition are the same as described above, but $GeCl_4$ was added to the raw material gases. This glass fine particle layer was heat treated, and a transparent glass film 132 for the core was prepared (FIG. 12B). This glass film was etched in a set pattern by lithography and reactive ion etching (RIE) to form the core 132a (FIG. 12C). As in the lower cladding layer, the formation of the glass film was repeated to form the upper cladding layer 142. $BCl_3$ was added to the raw material gases for the deposition of the glass fine particle layer, and the heat treatment was conducted at a lower temperature to form a glass film.

Figure 12D:
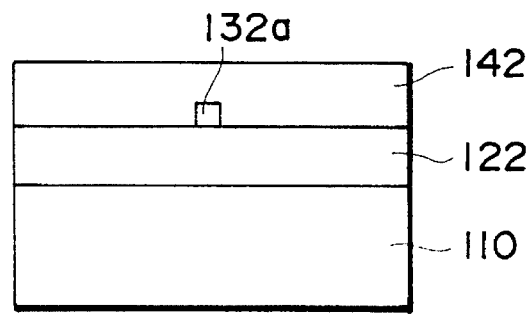

Thus, as shown, the lower cladding layer 122 is formed on the Si wafer 110, and the core 132a in the form of linear ridges is formed thereon. The upper cladding layer 142 is formed to cover the core 132a, and an optical waveguide was completed (FIG. 12D). A distribution of $P_2O_5$ concentrations in these cladding layers are substantially uniform, and the glass films had substantially uniform refractive indexes.

Thus, in the third embodiment the flame hydrolysis deposition step and the vitrification step were repeated three times, whereby glass films having substantially set phosphorus concentration could be formed. But the inventors thought that to reduce propagation losses of the optical waveguide to be fabricated, it is preferable to form a cladding layer having uniform phosphorus concentrations. Then times of repetition of the flame hydrolysis deposition step and the vitrification step were further increased to improve uniformity of phosphorus concentrations. The fourth embodiment which will be explained later is a method for fabricating the optical waveguide in which these steps were repeated six times.

First a glass fine particle layer 120 to be the lower cladding layer is deposited on each Si substrate 110 (FIG. 11A). The conditions for the deposition were the same as in the first embodiment but as shown in Table 2, in the feed amounts of the raw material gases $POCl_3$ feed amount was increased, and a deposition time was 7.5 minutes. The glass fine particle layer 120a was heat treated, and a transparent glass film 122a was prepared (FIG. 11B).

TABLE 2

| RAW MATERIAL GAS | FLOW RATE (cc/min) |
| --- | --- |
| $SiCl_4$ | 100 |
| $BCl_3$ | 30 |
| $POCl_3$ | 14.5 |

The deposition and vitrification of the glass fine particle layer was repeated six times, and a lower cladding layer 122 having six layers of an about 5 μm-thickness glass film was formed in a 30 μm-thickness.

Figure 14:
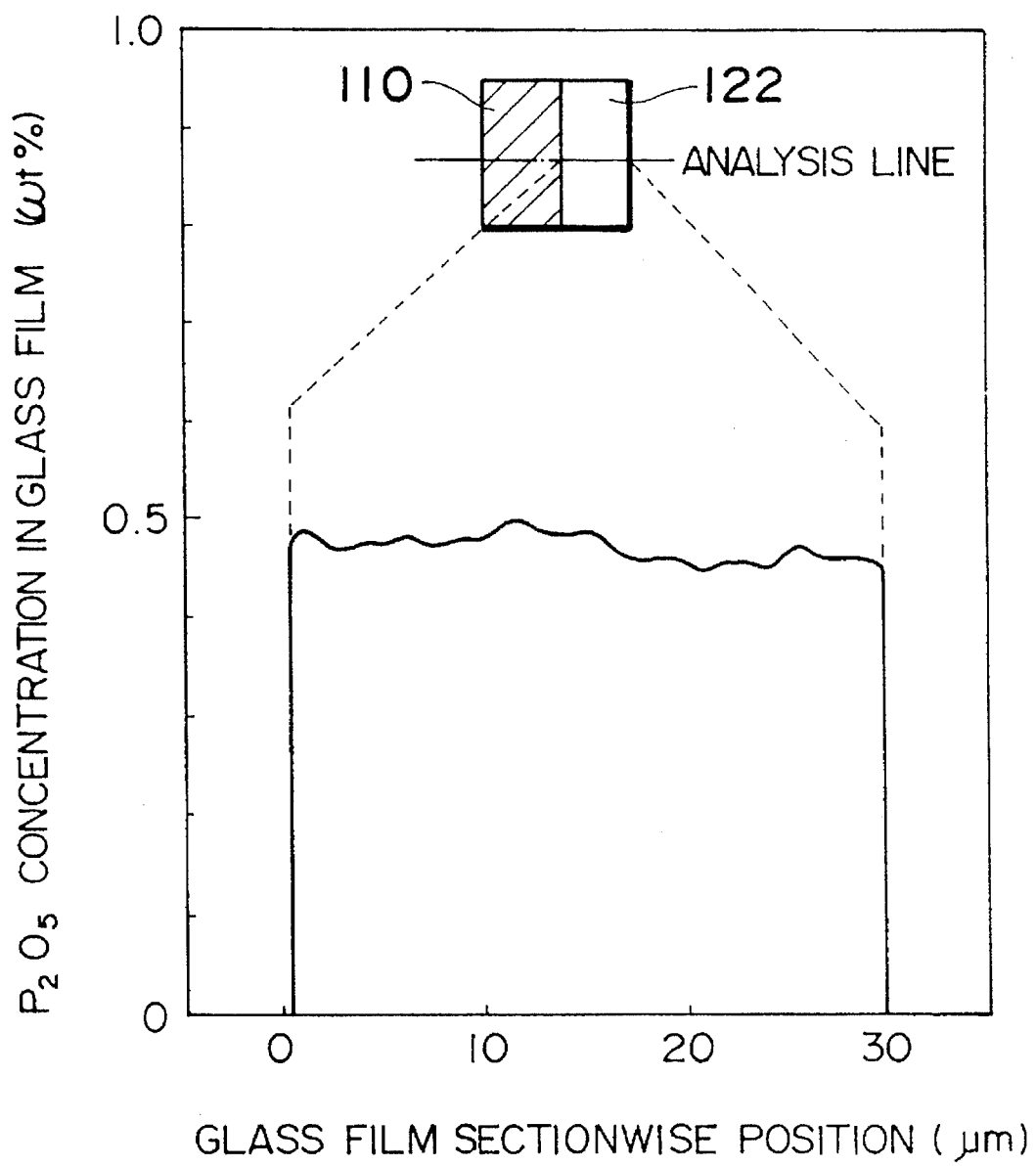
FIG. 14 is a graph of the compositions of the glass films prepared by the method according to the fourth embodiment.

FIG. 14 shows the result of analysis of $P_2O_5$ concentrations in the thus-prepared lower cladding layer 122. As shown in FIG. 14, in the lower cladding layer 122 a $P_2O_5$ concentration is substantially 0.5 wt %, and changes of refractive indexes Δn are ±0.0015%. In this case as well, it is found that the $P_2O_5$ is homogeneously distributed, and a homogeneous glass film could be prepared.

Then, in the same way as in the first embodiment, a transparent glass film 132 for the core was formed (FIG. 12B). Next the formation of the core 132a by etching (FIG. 12C) was followed by the same fabrication steps as in the formation of the lower cladding layer 122, and the upper cladding layer 142 was formed (FIG. 12D). A distribution of $P_2O_5$ concentrations in the cladding layer was substantially uniform, and the thus-fabricated optical waveguide had glass films with substantially uniform refractive indexes.

Figure 15:
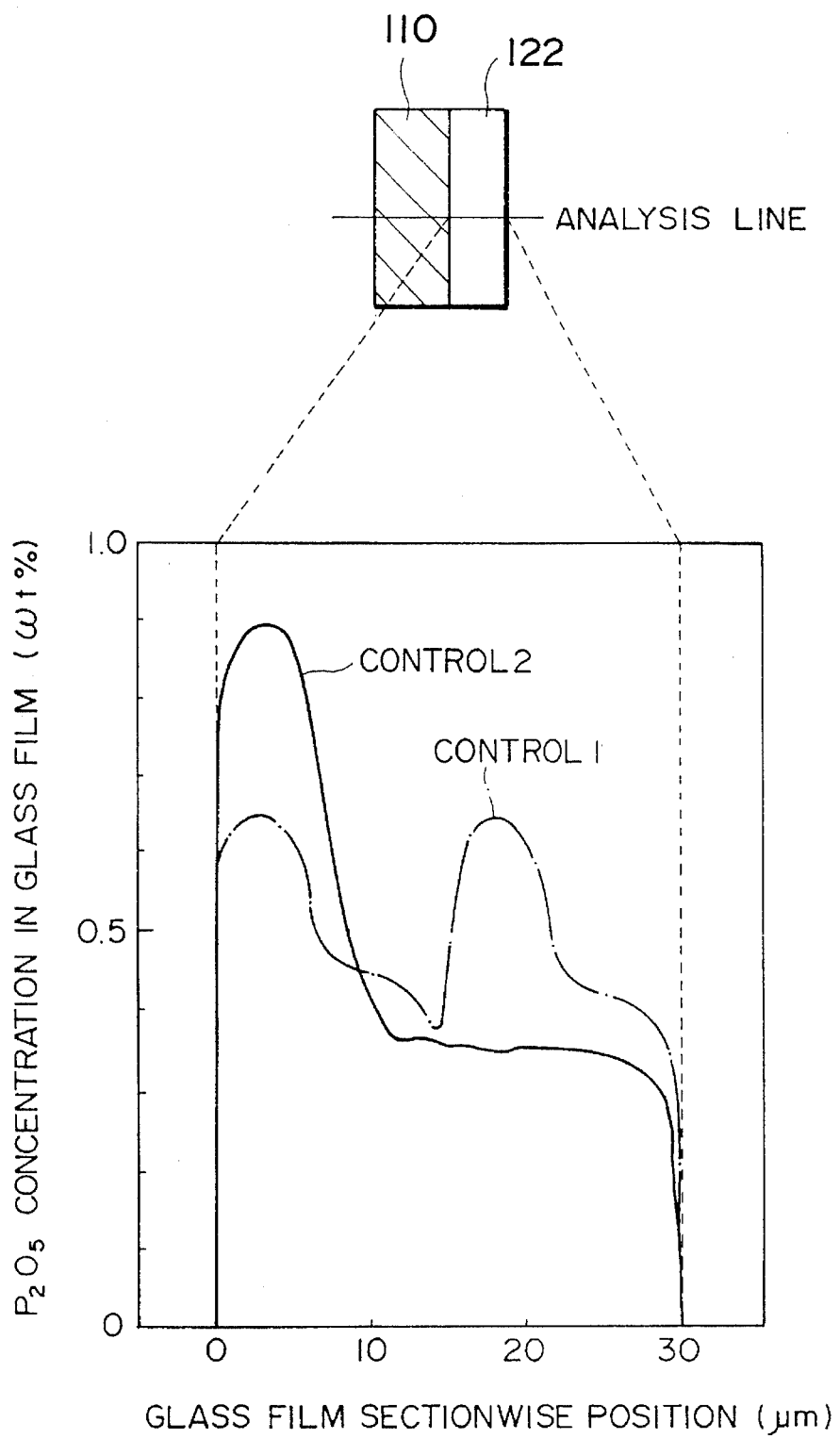
FIG. 15 is a graph of the compositions of the glass films prepared by controls.
Figure 16A:
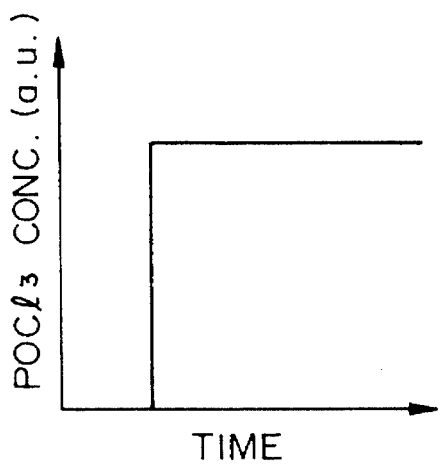
FIGS. 16A, 16B, 16C, and 16D are graphs of patterns of changes of feeding flow rates of $POCl_4$.
Figure 16B:
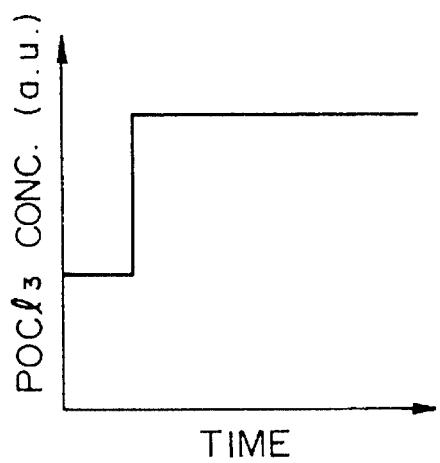
Figure 16C:
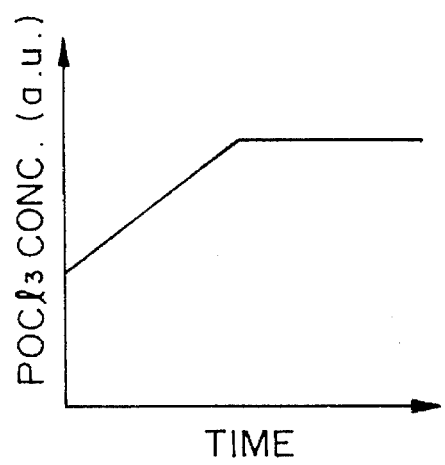
Figure 16D:
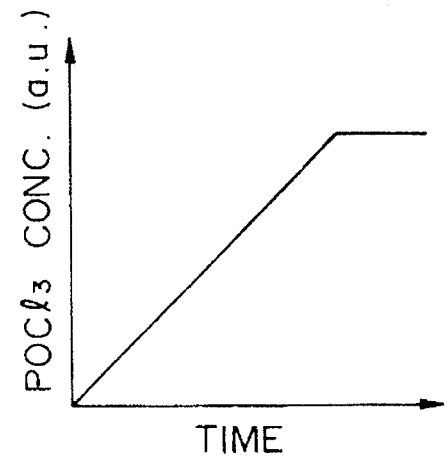

FIG. 15 shows results of analysis of a $P_2O_5$ concentration distribution in the cladding layers of controls for making sure the effects of the third and the fourth embodiments (the solid line indicates Control 1, and the one-dot chain line indicates Control 2).

In these Controls, to form cladding layers (film thickness: 30 μm, phosphorus concentration: 0.5%) having the same characteristics as the above-described embodiments, the compositions of the raw material gases of the conditions for forming glass fine particle layers in Table 3 were used (the other conditions were the same as in the above-described embodiments). In Control 1, the glass fine particle layer was deposited with a depositing time set at 22.5 minutes, and the glass fine particle layer was vitrified under the same conditions to form the glass film.

This glass film forming step was repeated twice to form a 30 μm-thickness lower cladding layer having two layers of such glass film. In Control 2, the glass fine particle layer was deposited with a depositing time set at 45 minutes, and then the glass fine particle layer was vitrified under the same condition as the above-described embodiments, and the glass film (lower cladding layer 122) was formed. That is, the formation of the lower cladding layer 122 of a 30 μm-thickness was conducted once as conventionally done.

TABLE 3

| RAW MATERIAL GAS | FLOW RATE IN CONTROL 1 (cc/min) | FLOW RATE IN CONTROL 2 (cc/min) |
| --- | --- | --- |
| $SiCl_4$ | 100 | 100 |
| $BCl_3$ | 30 | 30 |
| $POCl_3$ | 4.9 | 2.4 |

Table 4 compares changes of $P_2O_5$ concentrations in the lower cladding layers 122, and the deposited glass films.

TABLE 4

| | CHANGE IN CONCENTRATION | THE NUMBER OF DEPOSITED LAYERS | THICKNESS OF GLASS FILM FOR ONE LAYER |
| --- | --- | --- | --- |
| EMBODIMENT 1 | ±0.04 | 3 | 10 |
| EMBODIMENT 2 | ±0.04 | 6 | 5 |
| CONTROL 1 | ±0.14 | 2 | 15 |
| CONTROL 2 | ±0.27 | 1 | 30 |

As evident from FIGS. 13, 14 and 15, in the phosphorus distribution in the cladding layer, a glass film of a smaller number of deposited layers has larger changes in a phosphorus concentration, the changes of the phosphorus concentrations are not in a range of ±0.13% in Control 1 or 2. It is evident that the changes of phosphorus concentrations indicated in control 1 and 2 are larger at below 10 μm-thicknesswise positions. But such changes are not found in the third embodiment in which one glass film has a 10 μm-thickness. It is found that a glass film formed in a below 10 μm-thickness by one synthesis is free from locally deviated deposition of phosphorus. Accordingly a thickness of the glass film is set at below 10 μm per one layer, and such glass films are laid into a glass layer, such as the cladding layer, whereby glass layers (cladding layers 122, 142) with a substantially homogeneous phosphorus composition can be formed, and changes of a refractive index can be suppressed.

Thus the method for fabricating the optical waveguide according to this invention can form the cladding layers 122, 142 of phosphorus compositions with substantially uniform refractive indexes, resultantly the cladding and the core can have substantially uniform refractive indexes, and the fabricated optical waveguide can have reduced propagation losses.

In the third and the fourth embodiments, raw material gases for the formation of the glass layers 122, 132, 142 were $POCl_3$ and $BCl_3$. In place of these raw material gases, $POCl_3$, $PCl_4$, $BBr_3$, etc. may be supplied to the flame burner 12. In the above-described embodiments, since the core 132a is not as thick as the cladding layers 122, 142, the core 132a is formed at once, but may be formed by laying glass films as is the cladding layer. The gases may be supplied to the flame burner 12 in the patterns of FIGS. 16A, 16B, 16C, and 16D as in the first embodiment.

In the third and the fourth embodiment, the flame hydrolysis deposition step and the vitrification step were repeated plural times to form the lower cladding layer 122. But needless to say, this process is applicable to the formation of the upper cladding layer 142. Thus, according to the method for fabricating the optical waveguide according to the third and the fourth embodiments, the fabricated optical waveguides had the phosphorus-doped lower cladding layer 122 or the upper cladding layer 142 having uniform thicknesswise phosphorus concentrations whose minimum phosphorus value is above at least 75 when a maximum phosphorus concentration is indicated by 100.

As described above, according to this invention, glass films of a below 10 μm-thickness are laid, whereby a core or a cladding layer of a required thickness can be formed. As a result optical waveguide which is free from locally deviated deposition of phosphorus can be fabricated.

What is claimed is:

1. A method for fabricating an optical waveguide with a lower cladding layer, an upper cladding layer, and a core layer disposed between the lower cladding and the upper cladding layers, the method comprising the steps of:

(a) arranging a burner near a substrate;

(b) supplying gases including $POCl_3$ and $SiCl_4$ to the burner in a first flow rate ratio of $POCl_3$ to $SiCl_4$ and during a first period of time, to form glass particles for the lower cladding layer on the substrate by a flame hydrolysis deposition method;

(c) supplying gases including $POCl_3$ and $SiCl_4$ to the burner in a second flow rate ratio of $POCl_3$ to $SiCl_4$ greater than the first flow rate ratio and after the first period of time, to form glass particles for the lower cladding layer on the substrate by the flame hydrolysis deposition method;

(d) consolidating the glass particles of steps (b) and (c) to form the lower cladding layer;

(e) forming the core layer with a refractive index higher than the lower cladding layer;

(f) supplying gases including $POCl_3$ and $SiCl_4$ to the burner in a third flow rate ratio of $POCl_3$ to $SiCl_4$ and during a third period of time, to form glass particles for the upper cladding layer on the substrate by the flame hydrolysis deposition method;

(g) supplying gases including $POCl_3$ and $SiCl_4$ to the burner in a fourth flow rate ratio of $POCl_3$ to $SiCl_4$ greater than the third flow rate ratio and after the third period of time, to form glass particles for the upper cladding layer on the substrate by the flame hydrolysis deposition method; and (h) consolidating the glass particles of the steps (f) and (g) to form the upper cladding layer with a refractive index lower than the core layer.

2. A method for fabricating an optical waveguide with a lower cladding layer, an upper cladding layer, and a core layer disposed between the lower cladding and the upper cladding layers, the method comprising the steps of:

(a) arranging a burner near a substrate;

(b) supplying gases including $POCl_3$ and $SiCl_4$ to the burner in a first flow rate ratio of $POCl_3$ to $SiCl_4$ and during a first period of time, to form glass particles for the lower cladding layer on the substrate by a flame hydrolysis deposition method;

(c) supplying gases including $POCl_3$ and $SiCl_4$ to the burner in a second flow rate ratio of $POCl_3$ to $SiCl_4$ greater than the first flow rate ratio and after the first period of time, to form glass particles for the lower cladding layer on the substrate by the flame hydrolysis deposition method;

(d) consolidating the glass particles of steps (b) and (c) to form the lower cladding layer;

(e) forming the core layer with a refractive index higher than the lower cladding layer;

(f) supplying gases including $POCl_3$ and $SiCl_4$ to the burner in a third flow rate ratio of $POCl_3$ to $SiCl_4$ greater than the second flow rate ratio and during a third period of time, to form glass particles for the upper cladding layer on the substrate by the flame hydrolysis deposition method;

(g) supplying gases including $POCl_3$ and $SiCl_4$ to the burner in a fourth flow rate ratio of $POCl_3$ to $SiCl_4$ greater than the third flow rate ratio and after the third period of time, to form glass particles for the upper cladding layer on the substrate by the flame hydrolysis deposition method; and (h) consolidating the glass particles of the steps (f) and (g) to form the upper cladding layer with a refractive index lower than the core layer.

3. A method for fabricating an optical waveguide with a lower cladding layer, an upper cladding layer, and a core layer disposed between the lower cladding and the upper cladding layers, the method comprising the steps of:

(a) arranging a burner near a substrate;

(b) supplying gases including $POCl_3$ and $SiCl_4$ to the burner in a first flow rate ratio of $POCl_3$ to $SiCl_4$ and during a first period of time, to form glass particles for the lower cladding layer on the substrate by a flame hydrolysis deposition method;

(c) supplying gases including $POCl_3$ and $SiCl_4$ to the burner in a second flow rate ratio of $POCl_3$ to $SiCl_4$ greater than the first flow rate ratio and after the first period of time, to form glass particles for the lower cladding layer on the substrate by the flame hydrolysis deposition method;

(d) consolidating the glass particles of steps (b) and (c) to form the lower cladding layer;

(e) forming the core layer with a refractive index higher than the lower cladding layer;

(f) supplying gases including $POCl_3$ and $SiCl_4$ to the burner in a third flow rate ratio of $POCl_3$ to $SiCl_4$ of about 10%, and during a third period of time, to form glass particles for the upper cladding layer on the substrate by the flame hydrolysis deposition method;

(g) supplying gases including $POCl_3$ and $SiCl_4$ to the burner in a fourth flow rate ratio of $POCl_3$ to $SiCl_4$ of about 15%, and after the third period of time, to form glass particles for the upper cladding layer on the substrate by the flame hydrolysis deposition method; and (h) consolidating the glass particles of the steps (f) and (g) to form the upper cladding layer with a refractive index lower than the core layer.

4. A method for fabricating an optical waveguide with a lower cladding layer, an upper cladding layer, and a core layer disposed between the lower cladding layer and the upper cladding layer, the method comprising the steps of:

(a) arranging a burner near a substrate;

(b) supplying first gases including P atoms and Si atoms to the burner in a first ratio of the P atoms to the Si atoms and during a first period of time, to form glass particles for the lower cladding layer on the substrate by a flame hydrolysis deposition method;

(c) supplying second gases including P atoms and Si atoms to the burner in a second ratio of the P atoms to the Si atoms greater than the first ratio and after the first period of time, to form glass particles for the lower cladding layer on the substrate by the flame hydrolysis deposition method;

(d) consolidating the glass particles of the steps (b) and (c) to form the lower cladding layer;

(e) forming the core layer with a refractive index higher than the lower cladding layer;

(f) supplying third gases including P atoms and Si atoms to the burner in a third ratio of the P atoms to the Si atoms and during a second period of time, to form glass particles for the upper cladding layer on the substrate by the flame hydrolysis deposition method;

(g) supplying fourth gases including P atoms and Si atoms to the burner in a fourth ratio of the P atoms to the Si atoms greater than the third ratio and after the second period of time, to form glass particles for the upper cladding layer on the substrate by the flame hydrolysis deposition method; and (h) consolidating the glass particles of the steps (f) and (g) to form the upper cladding layer with a refractive index lower than the core layer.

5. A method for fabricating an optical waveguide with a lower cladding layer, an upper cladding layer, and a core layer disposed between the lower cladding layer and the upper cladding layer, the method comprising the steps of:

(a) arranging a burner near a substrate;

(b) supplying first gases including P atoms and Si atoms to the burner in a first ratio of the P atoms to the Si atoms and during a first period of time, to form glass particles for the lower cladding layer on the substrate by a flame hydrolysis deposition method;

(c) supplying second gases including P atoms and Si atoms to the burner in a second ratio of the P atoms to the Si atoms greater than the first ratio and after the first period of time, to form glass particles for the lower cladding layer on the substrate by the flame hydrolysis deposition method;

(d) consolidating the glass particles of the steps (b) and (c) to form the lower cladding layer;

(e) forming the core layer with a refractive index higher than the lower cladding layer;

(f) supplying third gases including P atoms and Si atoms to the burner in a third ratio of the P atoms to the Si atoms greater than the second ratio and during a second period of time, to form glass particles for the upper cladding layer on the substrate by the flame hydrolysis deposition method;

(g) supplying fourth gases including P atoms and Si atoms to the burner in a fourth ratio of the P atoms to the Si atoms greater than the third ratio and after the second period of time, to form glass particles for the upper cladding layer on the substrate by the flame hydrolysis deposition method; and (h) consolidating the glass particles of the steps (f) and (g) to form the upper cladding layer with a refractive index lower than the core layer.

6. A method for fabricating an optical waveguide with a lower cladding layer, an upper cladding layer, and a core layer disposed between the lower cladding layer and the upper cladding layer, the method comprising the steps of:

(a) arranging a burner near a substrate;

(b) supplying first gases including P atoms and Si atoms to the burner in a first ratio of the P atoms to the Si atoms and during a first period of time, to form glass particles for the lower cladding layer on the substrate by a flame hydrolysis deposition method;

(c) supplying second gases including P atoms and Si atoms to the burner in a second ratio of the P atoms to the Si atoms greater than the first ratio and after the first period of time, to form glass particles for the lower cladding layer on the substrate by the flame hydrolysis deposition method;

(d) consolidating the glass particles of the steps (b) and (c) to form the lower cladding layer;

(e) forming the core layer with a refractive index higher than the lower cladding layer;

(f) supplying third gases including P atoms and Si atoms to the burner in a third ratio of the P atoms to the Si atoms of about 10%, and during a second period of time, to form glass particles for the upper cladding layer on the substrate by the flame hydrolysis deposition method;

(g) supplying fourth gases including P atoms and Si atoms to the burner in a fourth ratio of the P atoms to the Si atoms of about 15%, and after the second period of time, to form glass particles for the upper cladding layer on the substrate by the flame hydrolysis deposition method; and (h) consolidating the glass particles of the steps (f) and (g) to form the upper cladding layer with a refractive index lower than the core layer.

* * * * *